United States Patent [19]

Pederson

[11] Patent Number: 4,935,819
[45] Date of Patent: Jun. 19, 1990

[54] PICTURE-WIDTH-ADAPTABLE TELEVISION RECEIVER

[75] Inventor: John J. Pederson, Barrington, Ill.

[73] Assignee: Zenith Electronic Corporation, Glenview, Ill.

[21] Appl. No.: 288,500

[22] Filed: Dec. 22, 1988

[51] Int. Cl.⁵ .............................................. H04N 5/64
[52] U.S. Cl. ...................................... 358/254; 358/93
[58] Field of Search ............... 358/230, 254, 255, 242, 358/93, 83, 87, 237

[56] References Cited

U.S. PATENT DOCUMENTS

| | | | |
|---|---|---|---|
| 2,543,136 | 2/1951 | Sweeney | 358/254 |
| 2,751,583 | 6/1956 | Jones | 358/254 |
| 4,394,690 | 7/1983 | Kobayashi | 358/237 |
| 4,633,322 | 12/1986 | Fourny | 358/254 |
| 4,760,455 | 7/1988 | Nagashima | 358/242 |

*Primary Examiner*—Tommy P. Chin

[57] ABSTRACT

A television receiver is disclosed which is capable of presenting a wide-screen picture format, and alternatively, a narrowed, partial-screen picture format having non-luminous side panels and visible vertical edges. The receiver includes a detector for detecting the transmission in a predetermined tuned television channel of the partial-screen picture format, and shutters movable in response to the detection of the transmission to conceal the non-luminous side panels of the screen and the visible vertical edges.

3 Claims, 1 Drawing Sheet

PICTURE-WIDTH-ADAPTABLE TELEVISION RECEIVER

BACKGROUND OF THE INVENTION

This invention relates to television receivers, and more particularly, to television receivers capable of displaying picture formats of different widths.

Present-day television receivers are capable of presenting pictures in color as well as in black and white. New technologies have brought to the fore an additional requirement in that television receivers must also be capable of displaying both wide-screen picture formats, and alternatively, a narrowed, partial-screen picture format. High-definition television, for example, requires a wide screen capable of displaying a format having an aspect ratio of five to three; that is, a ratio of five wide to three high. The standard NTSC picture format has a relatively narrower format; that is, a format with an aspect ratio of four to three. High-definition television receivers must also be capable of displaying the NTSC narrower-screen format.

When an NTSC format is displayed on a wide screen, edge artifacts otherwise hidden by the escutcheon of the receiver may appear such as uneven picture borders attributable to occasional overscanning of the picture. Other hindrances to viewer satisfaction may occur, such as browning of the glass of the faceplate in the pattern of the narrow screen picture, and the unpleasing aspect of a narrow-screen picture displayed on a wide screen in which a substantial part of the screen on either side of the picture is unillumined glass.

Television receivers are known in the prior art which have the capability of presenting as an inset to the overall picture a smaller picture from another channel. The smaller picture is normally framed with a black border to prevent overlap of the images and hide edge artifacts present in the smaller picture.

OBJECTS OF THE INVENTION

It is a general object of this invention to enhance the appearance of television receivers capable of displaying both wide-screen and partial-screen picture formats.

It is an object of this invention is enhance the appearance of television receivers capable of displaying wide-screen and partial-screen picture formats when the receiver is off.

It is another object of the invention to conceal visible vertical edges and edge artifacts of narrow, partial-screen picture formats displayed on a wide screen.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
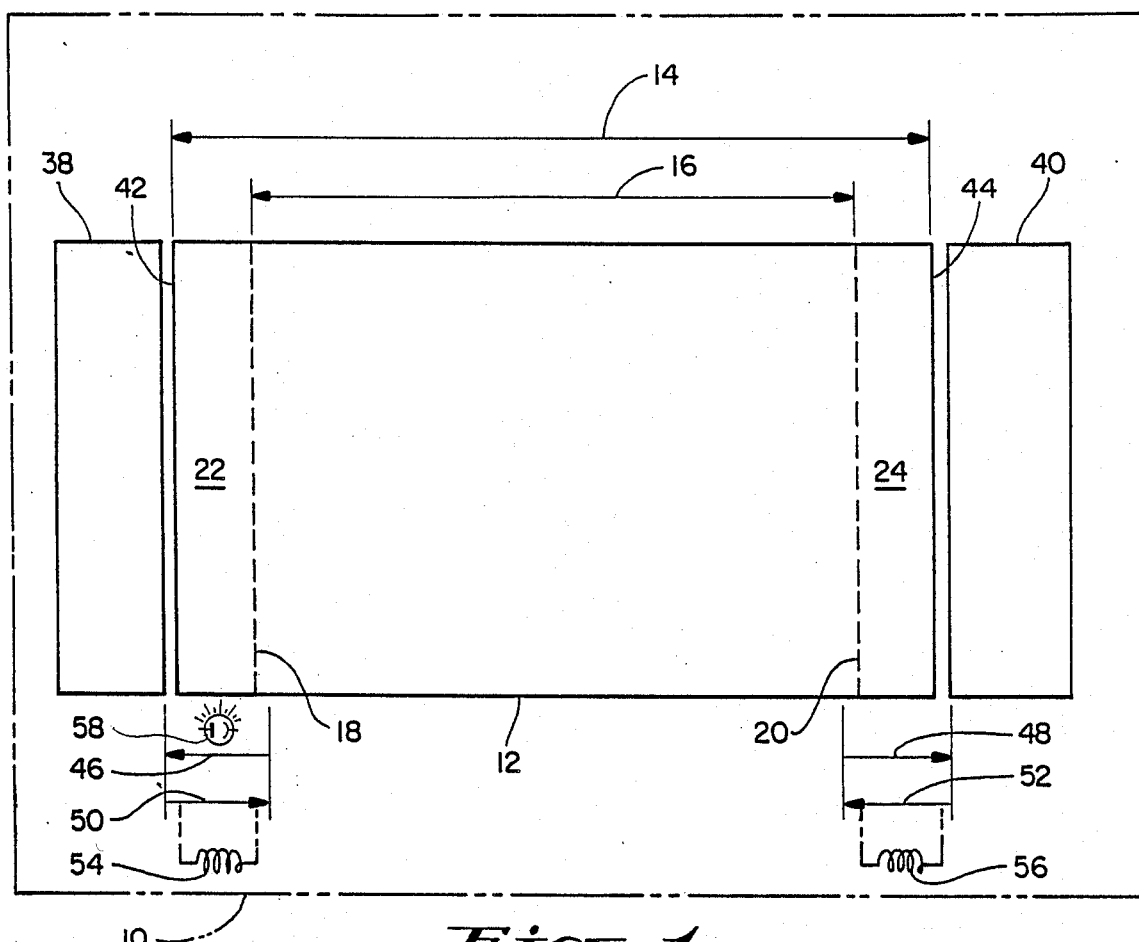
FIG. 1 is a diagrammatic view of a television receiver having a screen capable of displaying both a wide-screen picture and a partial-screen picture; the vertical dashed lines schematically denote the width limits of the partial-screen picture.

FIG. 1 depicts schematically a television receiver 10 having a screen 12 capable of presenting a wide-screen picture format 14, the width of which is indicated by the arrow, and alternatively, a narrowed, partial-screen picture format 16, the width of which is also indicated by an arrow and the dashed lines 18 and 20. The wide-screen picture format 14 is indicated as having an aspect ratio of five wide by three high, and the narrowed, partial-screen format 16, an aspect ratio of four wide by three high. When the television receiver is receiving a partial-screen picture, the screen 12 will exhibit non-luminous side panels 22 and 24, as well as visible vertical edges in the region indicated by the dashed lines 18 and 20. (N.B. Side panels 22 and 24 are "non-luminous" only when a partial-screen picture format is displayed.)

Figure 2:
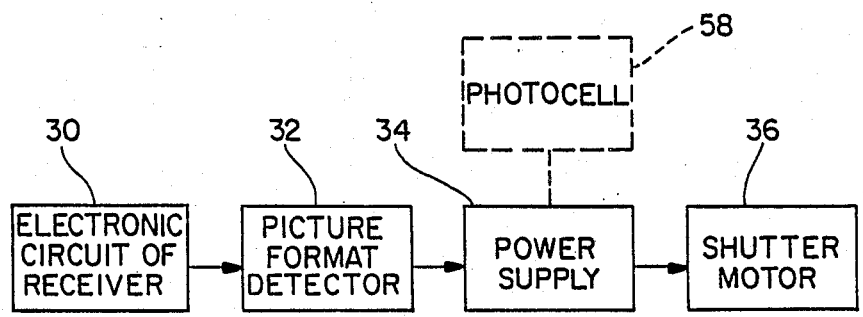
FIG. 2 is a simplified block diagram indicating means for detection of picture format and subsequent response according to the invention.

Television receiver 10 includes electronic detection means 28 indicated in FIG. 2 for detecting the transmission in a predetermined tuned television channel of a partial-screen picture format. Detection means 28 may comprise, by way of example, four stages including the electronic circuit 30 of the receiver 10, picture format detection means 32, and a power supply 34 for energizing motor means 36. Motor means 36 activates mechanical means movable in response to the detection of transmission of a partial-screen picture format.

The mechanical means are indicated schematically as comprising shutters 38 and 40. Means are included for traversing shutters 38 and 40 to and from the sides 42 and 44 of the picture screen 12, as indicated by the respective arrows 46, 48, and arrows 50, 52. The means for traversing the shutters comprises motor means 36.

Shutters 38 and 40, indicated schematically as flat panels, may comprise accordion panels built into the picture tube escutcheon (not shown). Alternatively, the shutters may comprise curtain screens which roll into the escutcheon on either side. These and other shuttering means for concealing the non-luminous side panels 22 and 24 when a partial-screen picture is displayed will readily suggest themselves to those skilled in the art.

The motor means may comprise, for example, solenoids or fractional horsepower a-c or d-c motors with limit switches, the selection and application of which is well known to those skilled in the art.

It is preferred that the shutters 38 and 40 move far enough from the sides 42 and 44 of the screen 12 to overlap and effectively conceal the edges 18 and 20 of the partial-screen picture format; this overlap is indicated diagrammatically by the extension of arrows 50 and 52 inside the limits of the picture edges 18 and 20. The distance the shutters must traverse to cover the side panels 22 and 24 will of course depend upon the size of the picture screen. For example, for a wide screen picture format having a diagonal measure of about 30 inches, the shutters will extend inwardly only about 3.25 inches to cover the non-luminous side panels 22 and 24 and provide adequate overlap of the edges 18 and 20.

The mechanical means may include according to the invention means for automatically positioning the shutters 38 and 40 to conceal side panels 22 and 24 when the television receiver 10 is off. This automatic positioning may be accomplished by spring means 54 and 56, which are indicated schematically as being in position to pull the shutters 38 and 40 from the sides 42 and 44, as indicated by arrows 50 and 52, to a "closed" position; that is, a position in which the non-luminous panels 22 and 24 are concealed. As a result, any browning of the glass of the picture tube faceplate attributable to the long-term display of a narrowed, partial-screen picture format 16 on wide-screen picture format 14 will not be visible when the television receiver 10 is off. If such spring means are used, the function of the motor means 36 will be simplified in that, when activated by the picture format detection means 32, the motor means 36 will be required only to move the shutters 38 and 40 to the sides of the screen 42 and 44 against the tension of the spring means, as indicated by arrows 46 and 48. When the receiver 10 is off, or when a narrowed, partial-screen picture format is detected, the motor means will be inactivated and the springs will serve to move the shutters 38 and 40 automatically from the sides 42 and 44 of screen 12. In other words, the shutters are preferably normally closed.

Alternatively, the picture format detection means may be external; that is, not derived from the interal television receiver circuit. For example, and according to the invention, an external picture format detection means may comprise a photocell 58, indicated diagrammatically. The photocell will be activated when, for example, side panel 22, normally non-luminous when a partial-screen picture format 16 is detected, becomes luminous when a wide-screen picture format 14 is present. With reference to FIG. 2, photocell 58, indicated by the dashed-outline box, will provide a voltage directed to the power supply 34 which in turn will activate motor means 36, which will then move the shutters 38 and 40 as described heretofore. The preceding stages indicated by boxes 30 and 32 will of course not be required in an external picture format detection means according to the invention.

While a particular embodiment of the invention has been shown and described, it will be readily apparent to those skilled in the art that changes and modifications may be made in the inventive means without departing from the invention in its broader aspects, and therefore, the aim of the appended claims is to cover all such changes and modifications as fall within the true spirit and scope of the invention.

I claim:

1. A television receiver comprises a picture screen capable of presenting a wide-screen picture format, and alternatively, a narrowed, partial-screen picture format having non-luminous side panels and visible vertical edges, said receiver including shutter means for concealing said non-luminous side panels, said receiver including photocell means for sensing light emitted from said side panels during reception of said wide-screen picture format, and means responsive to said photocell means for opening said shutter means to expose said side panels during reception of a wide-screen picture format.

2. The television receiver according to claim 1 wherein said shutter means are normally positioned to conceal said side panels when said television receiver is off.

3. A television receiver comprises a picture screen capable of presenting a wide-screen picture format, and alternatively, a narrowed, partial-screen picture format having non-luminous side panels and visible vertical edges, said receiver including shutter means normally positioned when said receiver is off to conceal said non-luminous side panels, said receiver including photocell means for sensing light emitted from said side panels when said receiver is on, and means responsive to said photocell means for opening said shutter means to expose said side panels during reception of a wide-screen picture format.

* * * * *